Patented July 11, 1939

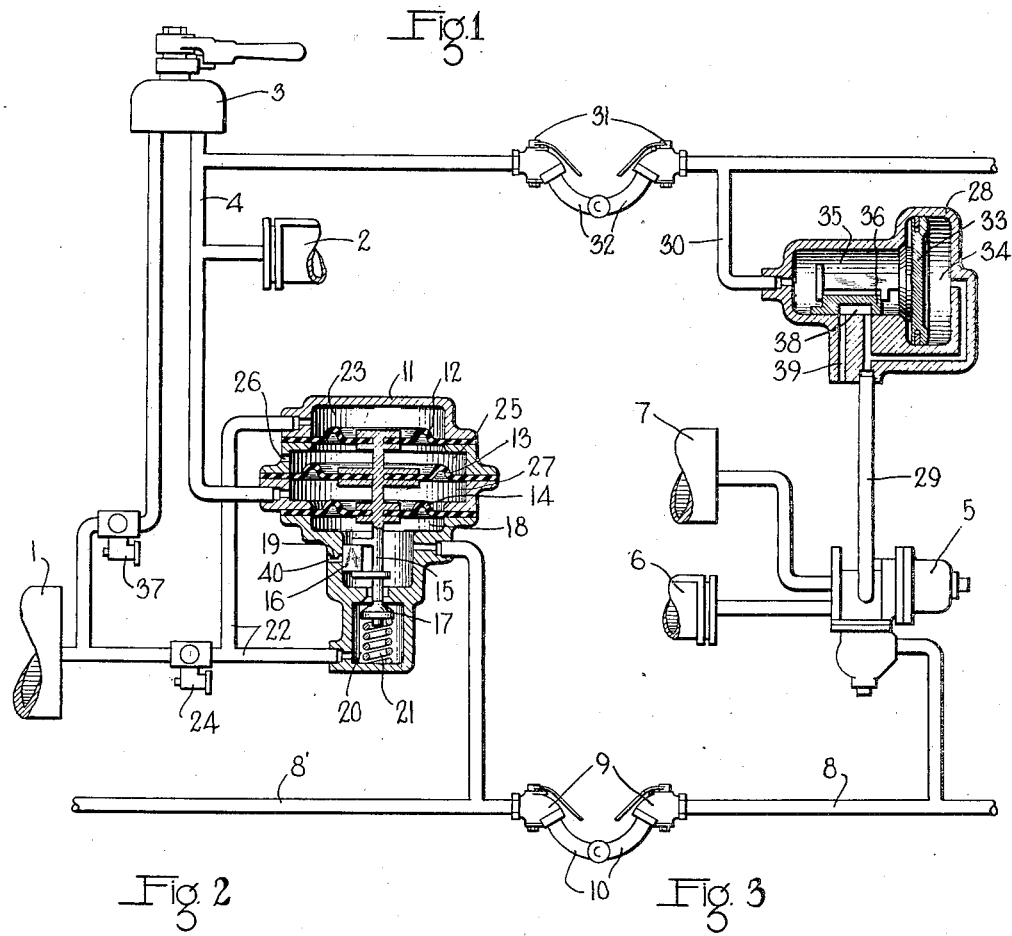

2,165,989

UNITED STATES PATENT OFFICE 2,165,989

FLUID PRESSURE BRAKE

Jean Guillemin Tarayre, Paris, and Anselme Neveu, Livry-Gargan, France, assignors, by mesne assignments, to The Westinghouse Air Brake Company, Wilmerding, Pa., a corporation of Pennsylvania Application August 6, 1937, Serial No. 157,692
In France September 29, 1936

17 Claims. (Cl. 303—26)

This invention relates to fluid pressure brakes of the type employed for stopping individual vehicles or trains thereof.

There are two types of brake systems in common use, the so-called straight air brake system generally employed for controlling the braking of individual vehicles or short trains of possibly two or three vehicles, and the automatic type which is employed for controlling the braking of longer trains.

In the usual straight air brake system, a straight air pipe is provided through which fluid under pressure is adapted to be supplied by a brake valve device for effecting an application of the brakes and from which fluid under pressure is adapted to be vented by said brake valve device to effect a release of the brakes, while in the usual automatic system a brake pipe is provided in which the pressure of fluid is adapted to be varied just the reverse of that in a straight air pipe for effecting an application or release of the brakes, that is, the pressure of fluid in the brake pipe has to be reduced to effect an application of the brakes and increased to effect a release of the brakes. It will therefore be evident that an automatic brake system cannot be connected directly to the usual straight air system and be controlled by the brake valve device thereof.

It however becomes desirable at times to haul a vehicle equipped with an automatic brake system by a vehicle equipped with a straight air system, and the principal object of the invention is to provide means for connecting together the two different braking systems on two coupled vehicles whereby the brakes on the vehicle equipped with the automatic brake system will apply and release in harmony with the application and release of brakes on the vehicle equipped with a straight air system as controlled by the straight air brake valve device forming a part of the straight air system.

Other objects and advantages will be apparent from the following more detailed description of the invention.

In the accompanying drawing: Fig. 1 is a diagrammatic view of a brake equipment embodying the invention; and Figs. 2 and 3 are sectional views of devices constituting variations in construction of one of the elements shown in Fig. 1.

The brake equipment shown in Fig. 1 of the drawing comprises a straight air brake system on a control vehicle and an automatic brake system on a coupled vehicle. The straight air brake system may be of any known type but for the purpose of illustration may comprise a main reservoir 1 adapted to be supplied with fluid under pressure from any suitable source, a brake cylinder 2 and a straight air brake valve device 3 adapted to supply fluid under pressure from the main reservoir to a straight air pipe 4 and from thence to the brake cylinder 2 for applying the brakes, and also adapted to vent fluid under pressure from said brake cylinder by way of the straight air pipe to the atmosphere for effecting a release of the brakes.

The automatic brake system on the coupled vehicle comprises a triple valve device 5, a brake cylinder 6 and an auxiliary reservoir 7. The triple valve device 5 is connected to a brake pipe 8, which extends from one end of the vehicle to the other, and is adapted to operate upon an increase in fluid pressure in said brake pipe to supply fluid under pressure therefrom to the auxiliary reservoir 7 and to release fluid under pressure from the brake cylinder 6, while upon a reduction in the pressure of fluid in said brake pipe, said triple valve device is adapted to operate to supply fluid under pressure from the auxiliary reservoir to the brake cylinder for applying the brakes.

The brake apparatus on the two coupled vehicles, as so far described, is so well known that a further description thereof is not deemed essential to a comprehensive understanding of the invention.

According to the invention a brake pipe 8' is provided on the straight air equipped control vehicle and is adapted to be connected to brake pipe 8 on the coupled vehicle through the usual angle cocks 9 and flexible hose connectors 10 on the two vehicles. Also, on the control vehicle there is provided a control valve device 11 which is adapted to operate in accordance with the variations in fluid pressure in the straight air pipe 4 to effect proportionate, inverse variations in the fluid pressure in the brake pipe 8', 8.

The control valve device 11 comprises three spaced flexible diaphragms 12, 13 and 14, of which the intermediate diaphragm 13 is of greater area than the other two which are of substantially the same area. These diaphragms are all connected to an operating stem 15 which is provided for operating a brake pipe discharge valve 16 and a brake pipe charging valve 17.

The brake pipe discharge valve 16 is contained in a chamber 18 formed at the lower face of diaphragm 14 and which is in permanent communication with the brake pipe 8', 8. The discharge valve 17 is contained in a chamber 20 and is provided to control communication between said chamber and chamber 18. A spring 21 in chamber 20 acts on the valve 17 to urge same to its seat. The chamber 20 is connected to a pipe 22 which leads to a chamber 23 formed at the outer face of diaphragm 12. The pipe 22 is connected to the main reservoir 1 through a feed valve device 24 which is provided to reduce main reservoir pressure to the degree normally carried in the brake pipe and supply fluid at this reduced pressure to said pipe.

A chamber 25 is formed intermediate the diaphragms 12 and 13 and is preferably open directly to the atmosphere through a passage 26, while a chamber 27, formed intermediate the diaphragms 13 and 14, is connected to the usual straight air pipe 4.

On the coupled vehicle there is provided a release control valve device 28 which is connected through a pipe 29 to the usual brake cylinder release port, not shown, in the triple valve device 5, and which also is connected to a pipe 30 which is connected to the straight air pipe 4 on the control vehicle through angle cocks 31 and flexible hose connectors 32.

The release control valve device 28 comprises a piston 33 having at one side a chamber 34 connected to the pipe 29, and having at the opposite side a valve chamber 35 connected to the pipe 30. A slide valve 36 is disposed in chamber 35 and is operatively connected to the piston 33 for movement therewith.

On the control vehicle, a feed valve device 37 is provided in the pipe through which fluid under pressure is adapted to be supplied from main reservoir 1 to the straight air brake valve device 3 for the purpose of reducing the pressure thus supplied to said brake valve device to a degree which equals the maximum obtainable in the brake cylinder on the coupled car due to operation of the automatic brake equipment thereon, as will be more fully described hereinafter.

In operation, with the two vehicles coupled together as shown in the drawing, and with the straight air brake valve device 3 in its usual release position, the straight air pipe 4 and thereby the brake cylinder 2 are vented to the atmosphere in the usual well known manner, and as a consequence, the chamber 27 in the control valve device 11 and the valve chamber 35 in the release control valve device 28 are also opened to the atmosphere.

With the main reservoir 1 supplied with fluid under pressure in the usual well known manner, the feed valve device 37 operates to supply fluid at the proper reduced pressure to the brake valve device 3, while the feed valve device 24 also operates to supply to chambers 20 and 23 in the control valve device 11 fluid at the normal pressure to be carried in the brake pipe 8', 8.

Since the diaphragm chambers 25 and 27 are at this time at atmospheric pressure, the pressure of fluid supplied by the feed valve device 24 to chamber 23, deflects the several diaphragms and thereby moves the connecting stem 15 downwardly. This acts to position the brake pipe discharge valve 16 and the supply valve 17 in the position shown in the drawing, in which fluid at the pressure supplied by feed valve device 24 flows past the supply valve 17 to chamber 18 and from thence to brake pipe 8'. Fluid under pressure thus obtained in brake pipe 8' on the control vehicle flows through the end cocks 9 and connectors 10 to brake pipe 8 on the coupled vehicle and from thence to the triple valve device 5.

The triple valve device 5 operates upon the consequent increase in brake pipe pressure, in the usual manner, to establish communication through which the auxiliary reservoir 7 is charged with fluid from and at the pressure supplied to the brake pipe. At the same time, the triple valve device also operates, as is well known, to connect the brake cylinder 6 to the usual atmospheric exhaust port, which, according to the invention, is normally open to the atmosphere through pipe 29, a cavity 38 in slide valve 36 of the release control valve device 28 and from thence through a passage 39 to the atmosphere.

In charging the brake system in the manner above described, the same pressures are obtained in the diaphragm chamber 18 of the control valve device 11 and in the brake pipe 8', 8 as is provided in chamber 23 of said device by operation of the feed valve device 24, and since the diaphragms 12 and 14 are of equal area, the pressure of spring 21 will then move the parts of the control valve device 11 to the position in which the valve 17 is closed. The parts of the control device will then remain in this position as long as the brakes are released unless there is leakage of fluid under pressure from the brake pipe 8', 8 or other parts of the equipment supplied with fluid under pressure from chamber 18, in which case the consequent reduction in pressure in said chamber below that acting in chamber 23 will position the parts of the control valve device 11 so that the valve 17 will be open a degree sufficient to maintain the pressure of fluid in chamber 18 and the brake pipe substantially equal to that in the diaphragm chamber 23.

With the brake system on the two vehicles charged with fluid under pressure and the brakes released, as above described, if it is desired to effect an application of the brakes on the two vehicles, the straight air brake valve device 3 is operated in the usual manner to supply fluid under pressure from the main reservoir 1 through the feed valve device 37 to the straight air pipe 4 and from thence to the brake cylinder 2 on the control vehicle, thereby applying the brakes on said vehicle.

Fluid under pressure thus supplied to the straight air pipe 4 also flows into chamber 27 in the control valve device 11 and acts on the differential areas of the diaphragms 13 and 14. Since the diaphragm 13 is of larger area than diaphragm 14, an unbalanced force is thereby produced acting in an upwardly direction which deflects said diaphragms and thereby moves the stem 15 in an upwardly direction. If the supply valve 17 is open at the time the application of brakes is initiated, the initial upward movement of stem 15 permits closing of said valve by spring 21. After valve 17 is seated the upward movement of stem 15 moves the discharge valve 16 past an atmospheric exhaust port 40, thereby opening said port to the valve chamber 18. Fluid under pressure is then vented from the brake pipe 8', 8 by way of valve chamber 18 and port 40 in which there is provided a choke or restriction 19.

The triple valve device 5 on the coupled vehicle responds to the reduction in brake pipe pressure effected by the control valve device 11 on the control vehicle, and operates in the usual manner to disconnect the brake cylinder 6 from the usual release passage and thereby pipe 29, and to supply fluid under pressure from the auxiliary reservoir 7 to said brake cylinder for applying the brakes on the coupled vehicle.

The choke 19 in the brake pipe discharge passage 40 of the control valve device 11 acts to control the rate at which the pressure of fluid in the brake pipe is reduced, and due to its location permits the pressure of fluid in the valve chamber 18 to remain substantially equal to that in the brake pipe during such reduction.

When the brake pipe pressure acting in the diaphragm chamber 18 is thus reduced sufficiently, with respect to the straight air pipe pressure acting in chamber 27, the pressure of fluid in diaphragm chamber 23, as supplied by the feed valve device 24, acts to deflect the several diaphragms downwardly and thereby move the stem 15 and slide valve 16 in the same direction, so that said slide valve will lap the exhaust port 40 and thereby prevent further venting of fluid under pressure from the brake pipe. After the slide valve 16 laps port 40, the several diaphragms and stem 15 may continue to move slightly and may actually move sufficiently to engage the stem of the charging valve 17, but further movement is then prevented due to the action of spring 21 on said charging valve, so that said charging valve remains seated. The control valve device 11 thus assumes, what is commonly known, as a lap position, in which fluid under pressure is neither supplied to nor vented from the brake pipe 8.

When the auxiliary reservoir pressure on the coupled vehicle becomes reduced by flow to the brake cylinder 6 to a degree slightly below the reduced pressure in brake pipe 8, the triple valve device 5 operates in the usual manner to cut off further flow of fluid under pressure to the brake cylinder 6, thereby limiting the degree of application of brakes on the coupled vehicle according to the degree of reduction in pressure in brake pipe 8, which in turn is controlled by the degree of pressure obtained in the straight air pipe 4, by operation of the straight air brake valve device 3.

The area of the diaphragm 13 in the control valve device 11 is so proportioned to the areas of the diaphragms 12 and 14, as to limit the degree of reduction in brake pipe pressure to an amount which, through operation of the triple valve device 5, will produce substantially the same pressure in the brake cylinder 6 on the coupled vehicle as obtained in the brake cylinder 2 on the control vehicle. For instance, let it be assumed that it is desired to apply the brakes on both vehicles with a brake cylinder pressure of 20 pounds. To effect this application the straight air brake valve device 3 is operated to supply fluid at this pressure to brake cylinder 2 and to diaphragm chamber 27 in the control valve device 11.

Let it further be assumed that the feed valve device 24 is adjusted to supply fluid at a pressure of 70 pounds to the diaphragm chamber 23 and to the brake pipe 8 and thereby the auxiliary reservoir 7 in charging the equipment, as hereinbefore described.

Now in order to obtain 20 pounds pressure in the brake cylinder 6, so as to equal that obtained in brake cylinder 2 on the control vehicle by the straight air operation, it is essential to permit fluid under pressure to flow from the auxiliary reservoir 7 to the brake cylinder 6 until the pressure in said reservoir is reduced approximately 11 pounds below that to which it was initially charged. It follows that a substantially 11 pound reduction in pressure in the brake pipe 8 is necessary on the triple valve device 5 in order to permit this flow of fluid from the auxiliary reservoir 7, and in order to effect this reduction in brake pipe pressure, the area of the diaphragm 13 of the control valve device 11 is so proportioned to the areas of the diaphragms 12 and 14, that when this reduction in brake pipe pressure is obtained in chamber 18, the pressure of fluid supplied by the feed valve device 24 to the chamber 23 and acting on the diaphragm 12 will effect movement of the control valve device to lap position against the opposing straight air pipe pressure acting in chamber 27.

More specifically, in order to obtain this synchronizing of the brake cylinder pressures on the two vehicles, the diaphragm 13 is approximately fifty per cent greater in area than the other two diaphragms, and by this particular proportioning of parts, the pressure obtained in the brake cylinder 6 due to operation of the automatic brake equipment will always be substantially the same as that obtained in the brake cylinder 2 by straight air, regardless of the degree of straight air application.

The maximum pressure obtainable in the brake cylinder 6 by operation of the triple valve 5 is limited to equalization of the fluid pressure initially provided in the auxiliary reservoir 7 into said brake cylinder. It is usual practice to so proportion the auxiliary reservoir to the brake cylinder as to provide an equalization equal to 50 pounds from an initial auxiliary reservoir pressure of 70 pounds, and this equalization is obtained upon a full service reduction in brake pipe pressure, as is well known. This 50 pounds pressure is therefore the maximum obtainable in the brake cylinder 6 under this particular pressure condition, and in order to limit to the same maximum degree the pressure obtainable in the brake cylinder 2 by straight air operation, the feed valve device 37 is provided which, if 70 pounds is carried in the brake pipe, is adjusted to limit the pressure of fluid supplied to the brake valve device 3 for supply to the brake cylinder 2 to a maximum of 50 pounds.

When an application of the brakes is effected, the pressure of fluid supplied to the straight air pipe 4 is transmitted to pipe 30 on the coupled vehicle and from thence to the valve chamber 35 of the release control valve device 28, and this pressure acting on the left hand face of the piston 33 moves said piston and thereby the slide valve 36 from the position shown in the drawing, toward the right hand to a position in which said piston engages the end wall of chamber 34. In this position of the slide valve 36, the triple valve release pipe 29 is disconnected from the atmospheric release port 39.

When it is desired to effect a release of the brakes after an application, the straight air brake valve device 3 on the control vehicle is operated in the usual manner to release fluid under pressure from the straight air pipe 4 and brake cylinder 2 and thereby from diaphragm chamber 27 in the control valve device 11 and from chamber 35 in the release control valve device 28.

This release of fluid from the brake cylinder 2 releases the brake on the control vehicle, and the consequent reduction in the pressure of fluid in chamber 27 of the control valve device 11 permits the feed valve pressure in chamber 23 of said device to move the diaphragms 12, 13 and 14 and thereby the stem 15 past the lap position, hereinbefore described, to the release position shown in the drawing.

This movement of the control valve device 11 from lap to release position acts to unseat the valve 17 whereupon fluid under pressure is supplied from the feed valve device 24 past said valve to chamber 18 and from thence to the brake pipe 8, thereby increasing the pressure of fluid in said chamber and brake pipe.

This increase in brake pipe pressure on the coupled vehicle effects operation of the triple valve device 5 to supply fluid under pressure from said brake pipe to the auxiliary reservoir 7, and to connect the brake cylinder 6 to the usual triple valve exhaust passage through which fluid is vented from said brake cylinder to the release pipe 29 from whence it flows to piston chamber 34 in the release control valve device 38.

The straight air pipe pressure is at this time reduced to a degree slightly below that in the brake cylinder 6 on the coupled vehicle, so that the pressure of fluid from the brake cylinder 6 acting in piston chamber 34 of the release control valve device sufficiently exceeds the straight air pipe pressure in valve chamber 35 to move the piston 33 and thereby the slide valve 36 from the right hand position to the position shown in the drawing. In this position of slide valve 36 the release pipe 29 is connected to the atmosphere through cavity 38 in said slide valve and the atmospheric port 39 so that fluid under pressure is thus permitted to flow from the brake cylinder 6 to the atmosphere and thereby release the brakes on the coupled vehicle.

If the brake valve device 3 is operated to effect a complete release of fluid under pressure from the straight air pipe 4 and brake cylinder 2 in one operation, the control valve device 11 will then act to completely recharge the brake pipe 8 to the normal pressure, as supplied by the feed valve device 24, and as a consequence the triple valve device 5 will remain in the release position so as to completely recharge the auxiliary reservoir 7, while the release control valve device 28 will remain in the position shown in the drawing so as to permit a complete and continuous release of fluid under pressure from brake cylinder 6 on the coupled vehicle.

The release of fluid under pressure from the brake cylinders 2 and 6 may, however, be graduated off in steps if desired, the pressure of fluid in the brake cylinder 6 being reduced by operation of the release control valve device 28 in increments corresponding to the graduation in pressure in the brake cylinder 2.

In order to effect a graduated release of fluid under pressure from the brake cylinders 2 and 6, the brake valve device 3 is operated to effect the desired degree of reduction in pressure in the brake cylinder 2, and this same degree of reduction in pressure also occurs in diaphragm chamber 27 of the control valve device 11 and in valve chamber 35 of the release control valve device 28. Now when, due to operation of the control valve device 11, the pressure of fluid in brake pipe 8 and diaphragm chamber 18 is increased an amount sufficient to slightly overbalance the reduced straight air pressure in diaphragm chamber 27, the brake pipe pressure in chamber 18 moves the several diaphragms and thereby the stem 15 in an upwardly direction to the lap position and this permits spring 21 to seat valve 17 so as to prevent further flow of fluid under pressure to the brake pipe 8.

This partial restoration of brake pipe pressure moves the triple valve device 5 to release position for recharging the auxiliary reservoir 7 to the pressure in the brake pipe and for connecting the brake cylinder 6 to the release pipe 29. Fluid under pressure thus obtained in pipe 29 and acting in the connected piston chamber 34 of the release control valve device, moves said device to the release position shown in the drawing, in which fluid is released from the brake cylinder 6 to the atmosphere through cavity 38 in slide valve 36 and the atmospheric port 39, in the manner hereinbefore described. When the pressure of fluid in brake cylinder 6 and in the connected piston chamber 34 thus becomes reduced to a degree just slightly less than the straight air pipe pressure acting in the brake cylinder 2 and valve chamber 35 of the release control valve device, the pressure in chamber 35 acting on the left hand face of piston 33 overcomes the opposing pressure of fluid in chamber 34 and moves said piston and thereby the slide valve 36 to their right hand position in which the release pipe 29 is disconnected from the atmospheric exhaust port 39 so as to prevent further venting of fluid under pressure from the brake cylinder 6. The degree of reduction in pressure in said brake cylinder 6 is thus limited in accordance with the degree of reduction in pressure in the straight air pipe 4 and brake cylinder 2 on the control vehicle, so that substantially the same fluid pressure acts in the two brake cylinders at the end of the partial release of the brakes. If desired, the brake valve device 3 may be again operated to effect another step of reduction in pressure in the straight air pipe 4 and brake cylinder 2, in which case the release control valve device 28 will again operate to effect a corresponding step of reduction in pressure in the brake cylinder 6, and in this manner the pressure of fluid in the two brake cylinders may be released substantially together in whatever increments are desired.

As hereinbefore mentioned, the control valve device 11 operates, in effecting a graduated release of the brakes, to increase the brake pipe pressure and thereby the pressure in the auxiliary reservoir 7 in steps proportionate to the degree of reduction in straight air pipe pressure. This is desirable in order to keep the pressure of fluid in the auxiliary reservoir 7, which determines the pressure of fluid obtained in brake cylinder 6 upon effecting an application of brakes, in proper relation to that in the straight air pipe 4, so that in case it is desired to reapply the brakes before a complete release thereof is obtained, the pressure obtained in the brake cylinder 6 will bear the proper relation to that obtained in the straight air pipe and thereby in the brake cylinder 2.

If there should be leakage of fluid under pressure from the brake cylinder 6, such leakage would tend to reduce the pressure of fluid therein to below that in the brake cylinder 2 on the control vehicle, when in effecting a graduated release of the brakes the release control valve device 28 is in its right hand position. In order to maintain the pressure of fluid in the two brake cylinders substantially equal at all times while graduating the release, the release control valve device 28' shown in Fig. 2 of the drawing may be employed in place of that shown in Fig. 1 of the drawing, if desired.

The release control valve device 28' comprises a piston 33' having at one side a chamber 35' connected to the pipe 30 and having at the opposite side a chamber 34' connected to the brake cylinder release pipe 29. A valve 36' is provided for controlling communication between the brake cylinder pipe 29 and a passage 39' leading to the atmosphere. The valve 36' is telescopically connected to the piston 33' through the medium of a pin 40 carried by said piston and extending through a slot provided in a stem carrying said valve, and interposed between said piston and valve stem is a spring 41 for normally maintaining the piston 33' in the position shown in the drawing, with respect to the valve 36'.

The operation of this modified release control valve device is similar to that shown in Fig. 1 in effecting a graduated release of the brakes in that when the pressure of fluid in the straight air pipe 4 is reduced by operation of the brake valve device 3, such reduction being effective in chamber 35' permits the pressure of fluid supplied from the brake cylinder 6 to chamber 34' to move said piston upwardly and thereby pull the valve 36' away from its seat so as to thereby permit the release of fluid under pressure from chamber 34' and thereby brake cylinder 6 to the atmosphere through the release port 39'. In this manner the pressure of fluid in the brake cylinder 6 may be reduced in harmony with that in the straight air brake cylinder 2.

However, in case there should be leakage from the brake cylinder 6 tending to reduce the pressure therein to below that acting in the brake cylinder 2 while the valve 36' is seated, then just as soon as the pressure in chamber 34' becomes reduced sufficiently below that in chamber 35' to compress the spring 41, the piston 33' is moved downwardly relative to the valve 36' to a position in which a by-pass groove 42 is opened to chamber 35', and through this by-pass groove fluid under pressure is adapted to flow from the straight air pipe 4 and brake cylinder 2 through chamber 35' to chamber 34' and from thence to brake cylinder 6, and in this manner maintain the pressure of fluid in the two brake cylinders equalized. When the pressure of fluid in the brake cylinder 6 is thus built up to substantially that in brake cylinder 2, then the spring 41 acts to move the piston 33' upwardly and thereby close communication through the by-pass groove 42, so that said piston will be in condition to respond to a further reduction in straight air pipe pressure for controlling the operation of the valve 36' in effecting a release of the brakes.

In effecting an application of the brakes it will be evident that when fluid under pressure is supplied to the straight air pipe 4 and thereby to piston chamber 35' in the release control valve device 28', the piston 33' will be moved down to open the by-pass groove 42 to chamber 35' so that fluid from the straight air pipe will also flow into chamber 34' and from thence to the pipe 29 leading a triple valve device 5. In the triple valve device, however, the port to which the pipe 29 is connected is lapped when the triple valve device is in the position effecting an application of the brakes, so that this supply of fluid from the straight air pipe to the triple valve device is immaterial in so far as effecting an application of the brakes is concerned. In the construction shown in Fig. 1, however, it will be noted that when an application of the brakes if effected as well as at all other times, there is no communication between the straight air pipe 4 and the triple valve release pipe 29 so that said pipe is not charged with fluid under pressure in effecting an application of the brakes.

The release control valve device 28 shown in Fig. 1, as well as the modified form shown in Fig. 2 are preferably adapted to be carried by the coupled vehicle and be connected to a pipe on that vehicle which is in turn connected to the straight air pipe on the control vehicle. By this arrangement, the release control valve is located close to the triple valve device and therefore is operative to locally vent the brake cylinder 6.

If desired, the venting of fluid from the brake cylinder 6 may however be effected directly through the brake valve device 3 by employing the release control valve device 28" shown in Fig. 3 of the drawing in place of that shown in Fig. 1 of the drawing. The release control valve device 28" comprises a casing having a chamber 35" connected to the pipe 30 and a chamber 34" connected to the pipe 29. The chambers 35" and 34" are separated by a partition wall 43 in which there is disposed a check valve 44 arranged to prevent flow of fluid from chamber 35' into chamber 34' and thus through the straight air pipe 4 to the triple valve release pipe 29, but to permit flow in the opposite direction from the brake cylinder 6 to the straight air pipe 4 and thereby to the atmosphere through the brake valve device 3 with the fluid under pressure from the brake cylinder 2. Through the medium of this device therefore the fluid under pressure from both brake cylinders is adapted to be released directly through the brake valve device 3 so that the pressures in both brake cylinders reduce in unison. A light bias spring 45 is provided in chamber 35' to act on the check valve 44 merely for the purpose of urging it to its seat, the only purpose of said check being to prevent the charging of the pipe 29 with fluid under pressure from the straight air pipe in effecting an application of the brakes.

It will be evident that the straight air brake system including the control valve device 11 on the control vehicle is not limited in use to the control of only one coupled vehicle equipped with the automatic brake system, but may be employed to control the automatic brake system of any desired number of vehicles coupled together in a train and provided with a release control valve device in one of the forms above described.

While several embodiments of the invention have been described in detail, it is not the intention to limit the scope to these embodiments, nor otherwise than by the spirit of the appended claims.

Having now described our invention, what we claim as new and desire to secure by Letters Patent, is:

1. In a fluid pressure brake, in combination, a straight air brake equipment having a straight air pipe, an automatic brake equipment having a brake pipe, and means controlled by the fluid pressures in said pipes and operative upon an increase in fluid pressure in said straight air pipe for effecting a reduction in fluid pressure in the brake pipe.

2. In a fluid pressure brake, in combination, a straight air brake equipment having a straight air pipe, an automatic brake equipment having a brake pipe, and means controlled by the fluid pressures in said pipes and operative upon an increase in fluid pressure in said straight air pipe for effecting a reduction in fluid pressure in the brake pipe proportional to the increase in fluid pressure in the straight air pipe.

3. In a fluid pressure brake, in combination, a straight air brake equipment having a straight air pipe, an automatic brake equipment having a brake pipe, and means subject to the opposing pressures of the straight air pipe and brake pipe and operative upon an increase in fluid pressure in said straight air pipe for effecting a reduction in fluid pressure in said brake pipe.

4. In a fluid pressure brake, in combination, a straight air brake equipment having a straight air pipe, an automatic brake equipment having a brake pipe, and means subject to the opposing pressures of said straight air pipe and brake pipe and operative to reduce and to increase the pressure of fluid in said brake pipe according to the increase and reduction, respectively, in pressure in said straight air pipe.

5. In a fluid pressure brake, in combination, a straight air pipe, a brake pipe, a valve device for controlling the supply of fluid under pressure to and the venting of fluid under pressure from said brake pipe, and means controlled by the fluid pressures in said pipes and operative upon an increase in straight air pipe pressure for operating said valve device to vent fluid under pressure from said brake pipe and operative upon a reduction in straight air pipe pressure to operate said valve device to supply fluid under pressure to said brake pipe.

6. In a fluid pressure brake, in combination, a straight air pipe, a brake pipe, a valve device for controlling the supply of fluid under pressure to and the venting of fluid under pressure from said brake pipe, and means subject to the opposing pressures of the straight air pipe and brake pipe and to a constant pressure and operative upon an increase in pressure in said straight air pipe to operate said valve device to cut off the supply of fluid under pressure to said brake pipe and to effect a reduction in brake pipe pressure and operative upon a reduction in straight air pipe pressure to operate said valve device to supply fluid under pressure to said brake pipe.

7. In a fluid pressure brake, in combination, a straight air pipe, a brake pipe, a valve device operative to effect a decrease and an increase in the pressure of fluid in said brake pipe upon an increase and decrease, respectively, in the pressure of fluid in said straight air pipe, and means controlled by a constant pressure equal to that normally carried in said brake pipe and by the pressures in said straight air pipe and brake pipe for controlling the operation of said valve device.

8. In a fluid pressure brake, in combination, a straight air pipe, a brake pipe, a valve device operative to effect a decrease and an increase in the pressure of fluid in said brake pipe upon an increase and decrease, respectively, in the pressure of fluid in said straight air pipe, and means connected to said valve device for controlling the operation thereof comprising a movable abutment subject to a constant pressure, another movable abutment of the same area as the first movable abutment subject to the pressure of fluid in said brake pipe acting in opposition to the pressure of fluid on the first abutment, and a third movable abutment subject to the pressure of fluid in said straight air pipe also acting in opposition to said constant pressure.

9. In combination, a straight air pipe, a brake pipe, a brake cylinder, valve means operative upon a reduction in the brake pipe pressure to supply fluid under pressure to said brake cylinder, valve means operative upon an increase in pressure in said straight air pipe to effect a reduction in pressure in said brake pipe and a valve device operative upon a reduction in pressure in said straight air pipe to release fluid under pressure from said brake cylinder.

10. In combination, a straight air pipe, a brake pipe, a brake cylinder, valve means operative upon a reduction in brake pipe pressure to supply fluid under pressure to said brake cylinder and upon an increase in brake pipe pressure to release fluid under pressure from said brake cylinder, a valve device operative upon an increase in straight air pipe pressure for closing communication through which fluid is released from said brake cylinder and upon a reduction in pressure in said straight air pipe to open said communication, and means operative upon an increase in pressure in said straight air pipe to reduce the pressure of fluid in said brake pipe and upon a reduction in pressure in said straight air pipe to increase the pressure of fluid in said brake pipe.

11. In combination, a straight air pipe, a brake pipe, a brake cylinder, valve means operative upon a reduction in brake pipe pressure to supply fluid under pressure to said brake cylinder and upon an increase in brake pipe pressure to release fluid under pressure from said brake cylinder, means operative upon an increase in fluid pressure in said straight air pipe for effecting a reduction in brake pipe pressures proportional in degree to the increase in pressure in said straight air pipe, and valve means subject to the opposing pressures of the straight air pipe and said brake cylinder for controlling communication through which fluid is released from said brake cylinder, said valve means being operative upon a decrease in the fluid pressure in said straight air pipe to effect a corresponding decrease in fluid pressure in said brake cylinder.

12. In combination, a straight air pipe, means for supplying fluid under pressure to said pipe to effect an application of the brakes and for releasing fluid under pressure from said pipe to effect a release of the brakes, a brake cylinder, valve means operative upon an increase in pressure in said straight air pipe to supply fluid under pressure to said brake cylinder and upon a reduction in pressure in said straight air pipe to establish a communication through which fluid under pressure is adapted to be released from said brake cylinder to said straight air pipe, and a check valve in said communication.

13. In combination, a straight air pipe, means for supplying fluid under pressure to said pipe to effect an application of the brakes and for releasing fluid under pressure from said pipe to effect a release of the brakes, a brake cylinder, valve means operative upon an increase in pressure in said straight air pipe to supply fluid under pressure to said brake cylinder and upon a reduction in pressure in said straight air pipe to establish a communication through which fluid under pressure is adapted to be released from said brake cylinder, and valve means subject to the opposing pressures in said straight air pipe and brake cylinder operative upon a reduction in pressure in said straight air pipe to below that in said brake cylinder to open said communication for releasing fluid under pressure from said brake cylinder and operative upon a reduction in pressure in said brake cylinder to a degree below that in said straight air pipe for closing said communication.

14. In combination, a straight air pipe, means for supplying fluid under pressure to said pipe to effect an application of the brakes and for releasing fluid under pressure from said pipe to effect a release of the brakes, a brake cylinder, valve means operative upon an increase in pressure in said straight air pipe to supply fluid under pressure to said brake cylinder and upon a reduction in pressure in said straight air pipe to establish a communication through which fluid under pressure is adapted to be released from said brake cylinder, and valve means subject to the opposing pressures in said straight air pipe and brake cylinder operative upon a reduction in pressure in said straight air pipe to below that in said brake cylinder to open said communication for releasing fluid under pressure from said brake cylinder and operative upon a reduction in pressure in said brake cylinder to a degree below that in said straight air pipe for closing said communication, and operative upon a further reduction in brake cylinder pressure to supply fluid under pressure from said straight air pipe to said brake cylinder.

15. In a fluid pressure brake, in combination, a straight air pipe, a brake pipe, means operative upon an increase in the fluid pressure in said straight air pipe to effect a reduction in the fluid pressure in said brake pipe, and operative upon a reduction in the pressure of fluid in said straight air pipe to effect an increase in the fluid pressure in said brake pipe, means for limiting the increase in pressure in said brake pipe to a predetermined degree, and means for limiting the increase in pressure in said straight air pipe to a predetermined lower degree.

16. In a fluid pressure brake, in combination, a straight air pipe, a brake pipe, means controlled by the fluid pressures in said pipes and operative upon an increase in the fluid pressure in said straight air pipe to effect a reduction in the fluid pressure in said brake pipe, and means for limiting the increase in pressure in said straight air pipe to a degree equal to that in said brake pipe upon a full service reduction in brake pipe pressure.

17. In a fluid pressure brake, in combination, a straight air pipe, a brake pipe, means operative upon an increase in the fluid pressure in said straight air pipe to effect a reduction in the fluid pressure in said brake pipe, and operative upon a reduction in the pressure of fluid in said straight air pipe to effect an increase in the fluid pressure in said brake pipe, means for limiting the increase in pressure in said brake pipe to a predetermined degree, and means for limiting the increase in pressure in said straight air pipe to a degree proportional to said predetermined degree.

JEAN GUILLEMIN TARAYRE.
ANSELME NEVEU.